United States Patent
Song et al.

(10) Patent No.: US 11,086,728 B2
(45) Date of Patent: Aug. 10, 2021

(54) METHOD FOR TRANSMITTING INSULATOR ON-SITE MONITORING DATA BACKUP

(71) Applicant: Nanjing Institute of Railway Technology, Nanjing (CN)

(72) Inventors: Qihou Song, Changzhou (CN);
Honggao Feng, Changzhou (CN);
Baichuan Xu, Changzhou (CN)

(73) Assignee: Nanjing Institute of Railway Technology, Nanjing (CN)

( * ) Notice: Subject to any disclaimer, the term of this patent is extended or adjusted under 35 U.S.C. 154(b) by 78 days.

(21) Appl. No.: 16/706,813

(22) Filed: Dec. 8, 2019

(65) Prior Publication Data
US 2020/0401486 A1 Dec. 24, 2020

(30) Foreign Application Priority Data
Jun. 24, 2019 (CN) .......................... 201910547908.7

(51) Int. Cl.
*G06F 11/14* (2006.01)
*G06F 16/901* (2019.01)
*G06F 3/06* (2006.01)

(52) U.S. Cl.
CPC .......... *G06F 11/1458* (2013.01); *G06F 3/065* (2013.01); *G06F 3/0619* (2013.01); *G06F 3/0679* (2013.01); *G06F 11/1451* (2013.01); *G06F 16/9024* (2019.01)

(58) Field of Classification Search
CPC .. G06F 11/1458; G06F 11/1451; G06F 3/065; G06F 3/0619; G06F 3/0679

USPC ......................................................... 711/162
See application file for complete search history.

(56) References Cited

U.S. PATENT DOCUMENTS

| | | | | |
|---|---|---|---|---|
| 2011/0011622 A1* | 1/2011 | Hyde | .................... | H01B 17/525 174/139 |
| 2011/0013323 A1* | 1/2011 | Hyde | ....................... | H02H 9/00 361/54 |
| 2011/0297132 A1* | 12/2011 | Schremmer | ............. | F02P 23/04 123/598 |
| 2017/0227596 A1* | 8/2017 | Sozer | .................. | G01M 5/0058 |

* cited by examiner

*Primary Examiner* — Than Nguyen
(74) *Attorney, Agent, or Firm* — Idea Intellectual Limited; Margaret A. Burke; Sam T. Yip

(57) ABSTRACT

The invention provides a method for transmitting insulator on-site monitoring data backup, comprising establishing connections between CPU and communication module, and between communication module and backup terminal, such that leak current data of horizontal and inclined insulators, and environmental humidity data are transmitted to backup terminal for storage to perform the backup; the number of CPUs matches that of backup terminals; each CPU is connected with all backup terminals through a corresponding communication module; CPU is also connected with flash memory. By incorporating other structures and methods, the invention effectively solves the problems in the existing data transmission mode that the data volume of data transmission in a set time and effect of transmission capacity of the communication module on data transmission, i.e., significant variation in transmission capacity of the communication module, relatively large volume of transmission by the communication module, hinderance of data transmission by other tasks, are ignored.

11 Claims, 2 Drawing Sheets

METHOD FOR TRANSMITTING INSULATOR ON-SITE MONITORING DATA BACKUP

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

This application claims priority from the China Patent Application No. 201910547908.7 filed Jun. 24, 2019; the disclosure of which is incorporated herein by reference in its entirety.

FIELD OF THE INVENTION

The present invention relates to the technical field of traction power supply, in particular, to a method for transmitting insulator on-site monitoring data backup.

BACKGROUND

Railway is a permanent way, in which steel rails are fixed on the sleepers at intervals, and the sleepers are placed on the horizontal or sloping subgrade with ballast to provide tracks for trucks, buses and other locomotives.

Insulator is an important equipment for traction power supply line. There is no real-time data monitoring of the contamination status of the insulator in the existing traction power supply system. When the insulator is seriously contaminated, flashover will occur, leading to short circuit causing a breaker to trip and resulting in train shutdown. Therefore, developing an equipment to monitor the contamination of insulators and provide real-time data of the surface contamination of the insulator with forecast alarm service is of great significance for a stable operation of the traction power supply network.

In order to achieve the effect of distributed storage, the number of central processing units (CPU) and that of communication modules are always the same and each unit is connected with one module. The number of CPU corresponds to the number of backup terminals, and because the transmission capacity of communication modules is limited, the size of data that CPU can transmit through communication modules is restricted within a timeframe. That is, the volume of transmission data is restricted within certain timeframe. Because each data transmitted by CPU through the communication module such as the leak current data of the horizontal insulator and leak the inclined insulator, and the environmental humidity parameter data, is different from one another in terms of characteristics and performance, the corresponding bit rate of each transmission data can also be different in order to reduce the transmission volume of the communication module, thus the data transmission performance is improved. However, the existing data transmission mode does not take the effect of the following parameters into account: the volume of the transmission data within a set time, and the transmission capacity of the communication module. Thus, it often occurs in the existing data transmission mode that the transmission capacity of the communication module varies dramatically or the volume of data transmission of the communication module becomes too large. In addition, it hinders the transmission data by other tasks.

SUMMARY OF THE INVENTION

The purpose of this section is to outline some aspects of embodiments of the invention and briefly introduce some preferred embodiments. Some simplification or omission may be made in this section, the abstract and the invention title of the present application to avoid confusion in the purpose of this section, the abstract and the invention title, and such simplification or omission cannot be used to limit the scope of the invention.

The invention is provided in view of the problems existing in the prior art.

Therefore, one of the objectives of the invention is to provide a method for transmitting insulator on-site monitoring data backup, which effectively overcome the deficiencies in the existing data transmission mode that does not take the effect of the following parameters into account: the data volume of the transmission data in a set time, and the transmission capacity of the communication module, leading to a significant variation in transmission capacity of the communication module or a large volume of data transmission of the communication module, hindering the transmission data by other tasks.

Advantages of the invention include: the invention can perform the transmission task according to the preset data volume and data transmission time of the transmission data in a set time, and transmit the data to the terminal where the identification code of the corresponding backup terminal is located, wherein the preset data volume of the transmission data in a set time can be configured flexibly according to the demand of the transmission capacity of the communication module and the current transmitted information. Thus, the problem of dramatic change in the transmission capacity of the communication module, leading to a large volume of data transmission of the communication module and unstable transmission data rate, is solved. The efficiency and accuracy of transmission data is therefore significantly improved.

BRIEF DESCRIPTION OF THE DRAWINGS

In order to more clearly illustrate the technical solution from the embodiments of the present invention, the drawings used in the description of the embodiments will be briefly described hereinafter. Obviously, the drawings provided hereinafter are only some embodiments of the present invention, and other drawings may also be derived therefrom by persons having ordinary skill in the art in view of the drawings, in which.

DETAILED DESCRIPTION

The above described objectives, features and advantages of the present invention will become more apparent from the following detailed description accompanied with the drawings.

Figure 1:
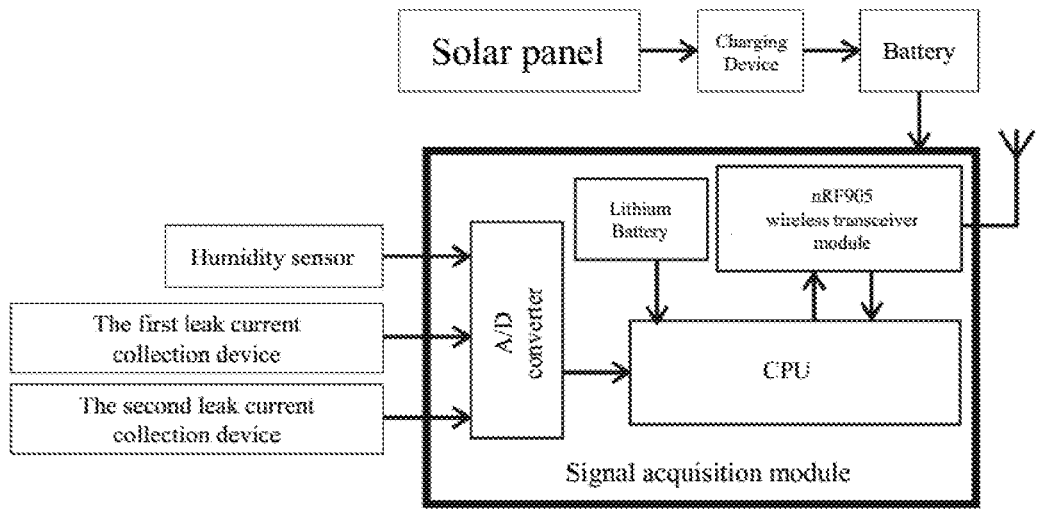
FIG. 1 is a schematic diagram depicting the working principle of the insulator condition detection according to an embodiment of the invention.
Figure 2:
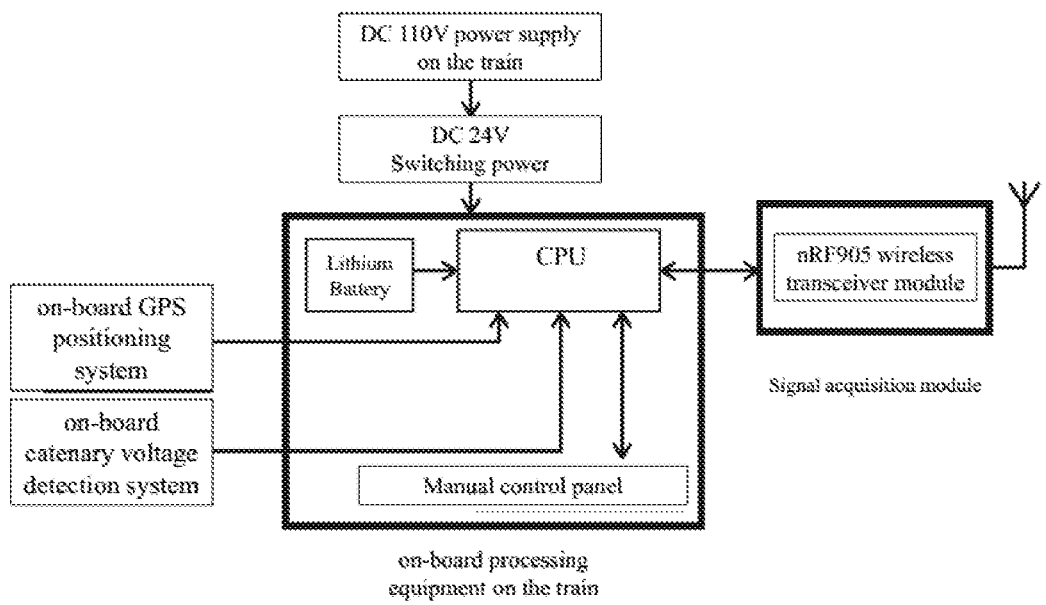
FIG. 2 is a schematic diagram depicting the working principle of the on-board data acquisition and processing in the train according to an embodiment of the invention.
Figure 3:
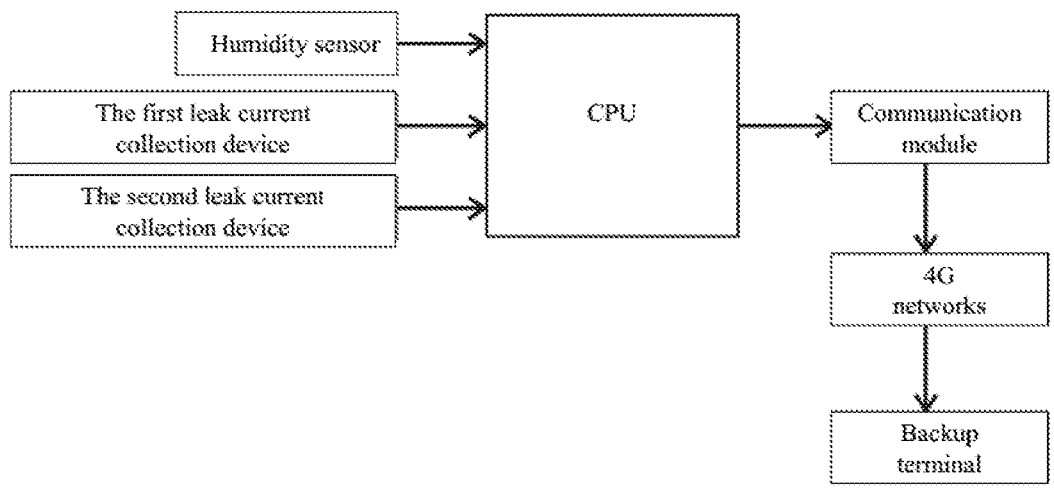
FIG. 3 is an outline of the system for a method of transmission of an insulator on-site monitoring data backup according to an embodiment of the invention.

According to FIGS. 1-3, an embodiment of the invention provides a traction power supply monitoring framework which includes an online contamination detection system for traction power supply insulator. The online contamination detection system for traction power supply insulator comprises an insulator condition detection part situated along the railway and an on-board data acquisition and processing part in the train. The online contamination detection system for traction power supply insulator further comprises a humidity sensor and signal acquisition module situated on overhead lines of a support structure. A leak current acquisition device is installed to supporting arm of the overhead lines where the insulator is proximal to sidewall of the support structure. The device can detect the leak current generated by the insulator. The humidity sensor is responsible for collecting the humidity of the environment where the insulator is located. The signal acquisition module collects and processes the parameters of humidity and leak current, and sends the useful information to the signal receiving module on the train through nRF905 wireless transceiver module. The signal receiving module and an on-board processing equipment are installed on the train. The signal receiving module receives the information from the signal acquisition module, and the information is transmitted to the on-board processing equipment. The on-board processing equipment records, analyses, and prints the catenary voltage of a feeder and the information related to contamination. When the train arrives at the station, the insulator contamination information is transmitted to the traction power supply section through the network of the station communication system. The insulator condition detection part includes a leak current collection device collecting leak current of the insulator, a signal acquisition module, a humidity sensor, a solar panel, a charging device, a battery, a wireless transceiver, and a CPU; the power of the signal acquisition module is supplied by the solar panel and a dual power supply from a combination of the battery and a lithium battery which are managed by a power management module. When the power supply from the battery is insufficient or fails, it will automatically switch to the lithium battery power supply; the leak current collection device is placed on the side of the insulator where it is more proximal to the ground, which adopts electromagnetic shield to isolate the leak current from the signal acquisition module, and then turns the leak current into a 4-20 mA standard industrial signal and transmits it to the A/D converter in the signal acquisition module, and then the digital information is processed by the CPU. The humidity sensor is placed near the insulator to detect the environmental humidity parameters. The humidity sensor converts the humidity signal into a 4-20 mA standard industrial signal and transmits it to the A/D converter in the signal acquisition module, and then the digital information is processed by the CPU; nRF905 wireless transceiver module is responsible for transmitting the collected information to the train on-board signal acquisition module, When the train passes through the device, the on-board signal acquisition module of the train sends a wake-up signal, which enables the nRF905 wireless transceiver module to start sending data. There are two leak current collection devices in the online contamination detection system for traction power supply insulator. The first leak current collection device detects the leak current of the horizontal insulator, and the second leak current collection device detects the leak current of the inclined insulator. The on-board signal acquisition and processing part in the train includes the power supply, the signal receiving module, on-board processing equipment and manual control panel; the power supply is charged by DC 110V of the train, which transforms 110V into 24V power supply for each component through switching power supply; the signal receiving module is composed of nRF905 wireless transceiver module, which is responsible for sending wake-up signals to the detection part, and collecting the information sent by the detection part at the same time. On-board processing equipment is responsible for sending wake-up command and receiving information, and transmitting the position of the train and corresponding catenary voltage information to CPU through on-board GPS positioning system and catenary voltage detection system. The processing unit analyses, processes and stores all collected information; manual control panel can control the setting of the contamination level. If it meets contamination level, the processing unit will incur command and generate alarm notice on the manual control panel, and relevant persons can carry out necessary processing.

By using the insulator leak current for on-line monitoring, each detection part has its own address, where the corresponding address and data are transmitted to the signal receiving module of the train running along the line. The signal acquisition and processing part of the train feeds back the insulator information to the traction power supply section, and cleans the insulator immediately to avoid flashover arising from contamination, in order to reduce the power requirement for the data collection while the number of GPS positioning equipment remains unchanged. The GPS positioning equipment on the train can be used to reduce the cost on the equipment and also the power requirements. Meanwhile, the voltage of the insulator is measured to determine the contamination level.

The data processed by the CPU includes leak current data of the horizontal insulator, leak current data of the inclined insulator and environmental humidity parameters. The leak current data of the horizontal insulator, leak current data of the inclined insulator and environmental humidity parameter data are respectively collected and converted by the first leak current collection device, the second leak current collection device and the humidity sensor. In order to perform the backup of the leak current data of the horizontal insulator, the leak current data of the inclined insulator and the environmental humidity parameter data, the CPU is connected to the communication module, and the communication module is connected through a network to a backup terminal in the network. The communication module can be a 4G module; the network can be a 4G network; the backup terminal can be a PC, thereby the leak current data of the horizontal insulator, the leak current data of the inclined insulator and the environmental humidity parameter data can be transmitted to the backup terminal for storage to perform backup. The number of the CPU and that of the communication module are the same and each unit is connected with one module. The number of CPU matches the number of backup terminals; each of the CPU is connected with all the backup terminals through the corresponding communication module; the CPU is also connected with a flash memory.

In the flash memory, it includes: a sequencing unit for transmitting transmission task into the data linked list; a retrieving unit for retrieving the transmission task from the data linked list according to the preset data volume of the transmission data in the set time; the data volume of the transmission data in the set time period includes executing the first data segment of the transmission task in the first set time period; a transmitting unit for executing the transmission task through a communication module, the transmitting unit includes: a transmission data subunit for transmitting the leak current data of the horizontal insulator through the communication module, the leak current data of the inclined insulator, or the environmental humidity parameter data to the backup terminal with the corresponding identification code of the backup terminal according to the transmission task including the leak current data of the horizontal insulator, the leak current data of the inclined insulator, or the environmental humidity parameter data and the corresponding identification code of the backup terminal.

The transmission task is retrieved from the data linked list according to a preset data volume of the transmission data in a set time period, followed by executing the transmission task through the communication module. The preset data volume of the transmission data in a set time period can be adjusted according to the transmission capacity of the communication module in order to overcome the problems of a relatively large variation in the transmission capacity of the communication module leading to overload of the transmission capacity of the communication module, or large fluctuation in transmission data performance, and also hinderance in the data transmission by other tasks. The data transmission performance is thereby improved according to the embodiments of the present invention.

In the flash memory, it includes: a sequencing unit for transmitting a transmission task into a data linked list; a main storage region request unit using fields as variables for requesting a data number in a main storage region, where the size of each field is 8 bits; a retrieving unit for retrieving the transmission task from the data linked list according to the preset data volume of the transmission data in the set time period, where the data volume of the transmission data in the set time period includes a first data segment of the transmission task being executed in a first set time period, which includes: a main storage region confirming unit for determining whether a transmitted flag has been stored in the main storage region of the first data segment in each of the first set time periods, where the main storage region is reset when each of the first time periods is completed. The reset is to store in the main storage region with a value of NULL; the transmitted flag is the stored transmitted flag after completing each transmission task; the data volume of the transmission data in the set time period includes the first data segment of the transmission task being executed in the first set time period. If the transmitted flag has been stored in the main storage region of the first data segment in each of the first time periods, it will switch to a first terminating unit to execute the first data segment until the end of the first set time period, and then switch to a reset unit to execute thereof when the first set time period is completed, followed by switching to a transmission task retrieving unit to execute. If the transmitted flag has not been stored in the main storage region of the first data segment in each of the first set time period, it will switch to the transmission task retrieving unit to execute, followed by switching to the reset unit to execute at the end of the first set time period; a first terminating unit for terminating retrieval of the transmission task from the data linked list; a transmission task retrieving unit for retrieving transmission task from the data linked list; a reset unit for resetting the main storage region; a transmitting unit for executing the transmission task through the communication module; a transmitted flag storing unit for storing the transmitted flag in sequence in a space being NULL in the main storage region after execution and completion of the current task.

In the flash memory, it includes: a sequencing unit for transmitting the transmission task into the data linked list; a main storage region request unit using fields as variables to request a data number in a main storage region; a retrieving unit for retrieving the transmission task from the data linked list according to the preset data volume of the transmission data in the set time period; the data volume of the transmission data in the set time period includes the first data segment of the transmission task being executed in a first set time period, which includes: a time confirming unit for determining whether time spent on storing the transmitted flag in the main storage region of the first data segment is shorter than the first set time period; the transmitted flag is the stored transmitted flag after completing each transmission task.

If the time spent on storing the transmitted flag in the main storage region of the first data segment is shorter than the first set time period, it will switch to a first terminating unit to execute until the sum of the time spent and a terminating time equals the first set time period, then it will switch to a reset unit to execute, followed by switching to the transmission task retrieving unit to execute.

If the time spent on storing the transmitted flag in the main storage region of the first data segment is not shorter than the first set time period, it will switch to a reset unit to execute, followed by switching to the transmission task retrieving unit to execute; a first terminating unit for terminating retrieval of the transmission task from the data linked list; a reset unit for resetting the main storage region; a transmission task retrieving unit for retrieving transmission task from the data linked list; a transmitting unit for executing the transmission task through the communication module; a transmitted flag storing unit for storing the transmitted flag in sequence in a space being NULL in the main storage region after execution and completion of the current transmission task.

In the flash memory, it includes: a sequencing unit for transmitting the transmission task into the data linked list; a retrieving unit for retrieving the transmission task through the data linked list according to the preset data volume of the transmission data in the set time period; the data volume of the transmission data in the set time period includes a first data segment of the transmission task being executed in a first set time period; a transmitting unit for executing the transmission task through the communication module; a critical number confirming unit for determining whether all numbers of the executed transmission task at the current time are equal to the preset critical number; if they are equal, it will switch to a second terminating unit, and after passing the preset second time period, it will switch to the transmitting unit to execute; a second terminating unit for terminating the preset second time period.

Based on the traction power supply monitoring framework, the invention also provides a method for transmitting insulator on-site monitoring data backup. The method includes the following steps:

Step 1: Connecting a corresponding communication module to a CPU of the insulator condition monitoring part; establishing a connection with a backup terminal through the communication module, and retrieving a transmission data (leak current data of the horizontal insulator, leak current data of the inclined insulator and environmental humidity parameter data) through the insulator condition monitoring part;

Step 2: Transmitting the transmission data to the backup terminal. The procedure can be executed according to the following four embodiments:

Example 1

Transmitting the transmission data to the backup terminal includes the following steps (steps A-1 to A-3):
A-1: transmitting the transmission task to the data linked list; the transmission task includes transmission data and an identification code of the backup terminal which includes a string for uniqueness of the setting, an IP address of the backup terminal, and a MAC address of the backup terminal. In this example, the leak current data of the horizontal insulator, the leak current data of the inclined insulator or environmental humidity parameter data is used as transmission data. In addition, the data linked list is added with a new data to a tail end of the data linked list, and a data is retrieved from a head end of the data linked list each time. The transmission task is transmitted to the data linked list, which is taking advantage of adding and retrieving data when it is in use. For example, if a CPU is used to transmit the leak current data of the horizontal insulator, the leak current data of the inclined insulator or the environmental humidity parameter data to three backup terminals, it will first construct the transmission task and transmit it to the data linked list in sequence, where the transmission tasks and the three backup terminals are as follows: a first transmission task, a second transmission task, and a third transmission task; the three backup terminals are first backup terminal, second backup terminal and third backup terminal, respectively. For each of the transmission tasks to be transmitted, the corresponding leak current data of the horizontal insulator, leak current data of the inclined insulator or environmental humidity parameter data, and the identification codes of the backup terminal are as follows: a first transmission task: the identification code of the backup terminal is the MAC address of the first backup terminal; the leak current data on the horizontal insulator, leak current data of the inclined insulator or environmental humidity parameter data to be transmitted; the identification code of the CPU; the identification code of the CPU is a marking of the CPU; a second transmission task: the identification code of the backup terminal is the MAC address of the second backup terminal; the leak current data on the horizontal insulator, the leak current data of the inclined insulator or environmental humidity parameter data to be transmitted; the identification code of the CPU; a third transmission task: the identification code of the backup terminal is the MAC address of the third backup terminal; the leak current data on the horizontal insulator, the leak current data of the inclined insulator or environmental humidity parameter data to be transmitted; the identification code of the CPU.
A-2: retrieving the transmission task from the data linked list according to a preset data volume of the transmission data in a set time period; the data volume of the transmission data in the set time period includes a first data segment of the transmission task being executed in a first set time period. For any communication module, the data number that can be transmitted in a set period of time is restricted. That is to say, the transmission capacity of the communication module has the highest critical number. In addition, within the same period of time, other irrelevant transmission tasks are also transmitted in the same transmission data. Therefore, according to the maximum transmission capacity of the communication module used and the status of the transmission capacity thereof at the current time point, a data configuration for the data volume of the transmission data in the set time period is preset. Typically, the data volume of transmission data in a set time period is the number of transmission data per 500 ms, or it can be the number of transmission data per 2 s or 3 h. In addition, the data volume of transmission data in the set time period can be preset before step A-2 or A-1. As for the CPU to transmit data to the backup terminal, the preset data volume of transmission data in the set time period is 48 for every 500 ms, so the data number in the first data segment of the transmission task is 48.
A-3: executing the transmission task through the communication module. The communication module is a port where the CPU transmits data to the backup terminal, which transmits the transmission data in the transmission task to the backup terminal according to the identification code of the backup terminal in the transmission task.
Step A-3 includes:
A-3-1: Using the communication module to transmit the leak current data of the horizontal insulator, the leak current data of the inclined insulator, or the environmental humidity parameter data to the backup terminal where the corresponding identification code of the backup terminal is located according to the transmission task including the leak current data of the horizontal insulator, the leak current data of the inclined insulator, or the environmental humidity parameter data and the corresponding identification code of the backup terminal. As for the first transmission task, second transmission task and third transmission task, according to the transmission task to be transmitted including the leak current data of the horizontal insulator, the leak current data of the inclined insulator, or the environmental humidity parameter data and identification code of the backup terminal, the data received by the backup terminals where the identification code of the final backup terminal is located, the identification code of a second backup terminal and the identification code of a third backup terminal through the communication module is as follows respectively:
Leak current data of the horizontal insulator, leak current data of the inclined insulator or environmental humidity parameter data; identification code of CPU; Leak current data of the horizontal insulator, leak current data of the inclined insulator or environmental humidity parameter data; identification code of CPU; Leak current data of the horizontal insulator, leak current data of the inclined insulator or environmental humidity parameter data; identification code of CPU; The transmission task is retrieved from the data linked list according to a preset data volume of the transmission data in a set time period, and then the communication module is used to perform the transmission task. In this example, the preset data volume of the transmission data in a set time period can be adjusted according to the transmission capacity of the communication module in order to overcome the problems of a relatively large variation in transmission capacity of the communication module, leading to overload of the transmission capacity of the communication module, or a large fluctuation of transmission data performance which hinders the data transmission by other tasks. The data transmission performance is thereby improved.

Example 2

Transmitting the transmission data to the backup terminal includes the following steps (steps B-1 to B-8):
B-1: transmitting the transmission task to the data linked list.

B-2: Using fields as variables to request a data number in a main storage region, where the size of each field is 8 bits. Using fields as variables to request a data number in a main storage region, where each main storage region can only be stored with NULL or 1, and after the main storage region is requested, an initial value is NULL for a un-transmitted flag. The requested main storage region is used to store the transmitted flag; the data number thereof is related to a preset data volume of the transmission data in a set time period, the data volume of the transmission data in the set time period includes a first data segment of the transmission task being executed in a first set time period; the first data segment of the transmission task in the first set time period acts as the data number in the main storage region. As for the CPU to transmit data to the backup terminal, the preset data volume of transmission data in the set time period is 48 data for every 500 ms, such that a first set time period included therein is 500 ms; the data number in the first data segment of the transmission task is 48, thereby the requested number for the main storage region is 48. The data is stored into the main storage region in a set order.

B-3: Confirming whether the transmitted flag has been stored in the main storage region of the first data segment in each of the first set time period. In this example, the main storage region is reset when each of the first set time period is completed; the reset is to store in the main storage region with a value of NULL; the transmitted flag is the stored transmitted flag after completing each transmission task; if the transmitted flag has been stored in the main storage region of the first data segment in each of the first set time period, it will switch to B-4 to execute until the end of the first set time period, followed by switching to B-5 to execute after the first set time period is completed; it will then switch to B-6 to execute: If the transmitted flag has not been stored in the main storage region of the first data segment in each of the first time period, it will switch to B-6 to execute, followed by switching to B-5 to execute after the end of the first time period. During data transmission configuration, after a transmission task is retrieved from the data linked list and executed, the transmitted flag will be stored in the corresponding main storage region. The transmitted flag is stored in the main storage region and is used to mark the completion of a transmission task. In this example, the completion of the transmission task includes successful transmission of data, or an incomplete transmission of data due to exceeding the set time by the communication module, where both of which will be stored as transmitted flag in the main storage region. Either a larger main storage region is used, or the amount of the transmitted flag of the user would be very small. In addition, the main storage region in each of the first set time period during that data transmission configuration is constant, and the value of the transmitted flag is 1. In each of the first set time period, from executing a first transmission task of a first current time period in each of the first set time period, once each of the first transmission task is completed, the value 1 will be stored in sequence in the first requested main storage region accordingly until the completion of the current first set time period. All main storage region requested in the reset will then enter into the subsequent first set time period. In the main storage region of the first data segment within each of the first set time period, the state of the main storage region stored with transmitted flag can be classified into the following two categories: in each of the first set time period, the transmitted flag has been stored in all of the main storage regions of the first data segment; in each of the first set time period, the transmitted flag has not been stored in all of the main storage regions of the first data segment.

B-4: Terminating retrieval of the transmission task from the data linked list.

B-5: Resetting the main storage region.

B-6: Retrieving the transmission task from the data linked list; if the transmitted flag has been stored in the main storage region of the first data segment in each first time period, and there is no other main storage region to keep storing the transmitted flag, then in addition to maintain the bit rate of the transmission data, the data will not be retrieved continuously through the data linked list until the first current period is completed. The main storage region will be reset as soon as the first current period is completed; in addition to ensure the integrity and continuity of the first time period, if there is no transmitted flag stored in the main storage region of the first data segment in the completion of each first time period, the main storage region is still reset to carry out the next of the first time period. As for the CPU, the first set time period is 500 ms, the requested main storage region is 48, and the transmitted flag is 1; if 48 main storage regions are stored with 1 in 500 ms, the transmission task will not be retrieved continuously until 500 ms, and the main storage region will be reset; if 48 main storage regions are been stored with 1 in 500 ms, the transmission task will be retrieved continuously until 500 ms, and the main storage region will be reset; in addition, if there are still 48 main storage regions without being stored with 1 at the end of 500 ms, while the transmission task is retrieved continuously until all main storage regions are stored with 1, a missing situation will often occur in the first set time period, which disturbs the continuity of the first set time period, and is unfavorable to the subsequent reset process. Therefore, whether or not 48 main storage regions have been stored with 1 or not, the transmission task will not be retrieved continuously and then reset the main storage regions at the end of 500 ms.

B-7: Executing the transmission task through the communication module.

B-8: After executing and completing the transmission task in the current time, the transmitted flag will be stored in a space with NULL in the main storage region in sequence. The main storage region is stored in a set order, and the stored area for the transmitted flag cannot be stored again in each of the first set time period. In addition, a configuration procedure can be used to achieve B-3 to B-5, and the configuration procedure can construct the startup process and the execution process respectively. In this example, the startup process retrieves the transmission task through the data linked list according to the conclusion in B-3; the execution process uses the communication module to perform the transmission task, and then stores the transmitted flag in sequence in the requested main storage region. And the configuration procedure can not only retrieve and execute one transmission task and store the delivery results in the main storage region, but also execute B-3 to B-5 again to retrieve and execute several transmission tasks respectively and store the delivery results in the main storage region. The transmission task is retrieved from the data linked list according to a preset data volume of the transmission data in a set time period, and then the communication module is used to perform the transmission task. In this example, the preset data volume of the transmission data in a set time period can be adjusted according to the transmission capacity of the communication module to overcome the problems of the significant variation in transmission capacity of the communication module, which makes the transmission capacity of the communication module too large, or the huge fluctuation of transmission data performance which will hinder the data transmission by other tasks. The data transmission performance is thereby improved. In addition, the preset requested main storage region according to the first data segment in the data volume of the transmission data in the set time period is used to store the transmitted flag; whether or not the requested main storage region has been stored with transmitted flag is recognized to retrieve the transmission task continuously for execution in a determined first set time period. It can greatly improve the control of the data volume of the transmission data in the set time period that is below or equal to the preset data volume of the transmission data in the set time period in order to improve the performance in configuring transmission information.

Example 3

Transmitting the transfer data to the backup terminal can include the following steps (steps C-1 to C-8):

C-1: transmitting the transmission task to the data linked list.

C-2: using fields as variables to request a data number in a main storage region.

C-3: confirming whether a time spent on storing the transmitted flag in the main storage region of the first data segment is shorter than the first time period; the transmitted flag is the stored transmitted flag after completing each of the transmission task. If the time spent on storing the transmitted flag in the main storage region of the first data segment is shorter than the first time period, it will switch to C-4 to execute until the sum of the time spent and a terminating time equals the first set time period, it will switch to C-5 to execute, and then it will switch to C-6 to execute. If the time spent on storing the transmitted flag in the main storage region of the first data segment is not shorter than the first set time period, it will switch to C-5 to execute, and then it will switch to C-6 to execute.

C-4: Terminating retrieval of the transmission task from the data linked list.

C-5: Resetting the main storage region.

C-6: Retrieving the transmission task from the data linked list. Comparing the time spent on storing the transmitted flag in the main storage region of the first data segment with the first set time period, that is, when the main storage region of the first data segment is filled up, the time spent from the confirmed first reset of the main storage region or the first retrieval of transmission task to the current time is compared with the first set time period. If the time spent on storing the transmitted flag in the main storage region of the first data segment is shorter than the first time period, there will be no additional main storage region to store the transmitted flag continuously, so as to maintain the bit rate of data transmission, the data will not be retrieved continuously from the data linked list until the first current time period is completed, and the main storage region will be reset when the current first set time period is completed; If the spending time for storing the transmitted flag in the main storage region of the first data segment is shorter than the first time period, the main storage region will be reset directly, and the next transmission task will be retrieved from the data linked list. As for the CPU mentioned above, the first time period is 500 ms, there are 48 requested main storage regions, and the transmission flag is 1. If transmission flag 1 is stored in all 48 main storage regions at the current time period, the time from the first reset of the main storage region or of the first transmission task retrieval from the data linked list until the current time period is compared with the first set time period of 500 ms. If the current time period is shorter than 500 ms, the transmission task retrieved from the data linked list and executed is terminated until the sum of the terminated time and the current time period is 500 ms, and 48 main storage regions are reset, then initiate the process of executing and retrieving the transmission task from the data linked list; if the current time period is not shorter than 500 ms, 48 main storage regions are reset directly, and continue to retrieve and execute the transmission task from the data linked list. In this way, it can be shown that the real time period from the first reset of the main storage region to the reset of the main storage region is not shorter than the first set time period, so as to ensure that a specific data volume of the transmission data in the set time period is not greater than the preset data volume of the transmission data in the set time period, so it is not feasible for the communication module to impose higher transmission volume.

C-7: Executing the transmission task through the communication module.

C-8: After executing and completing the transmission task at the current time, the transmitted flag will be stored in a space with NULL in the main storage region in sequence. The transmission task is retrieved and executed according to the preset data volume of the transmission data in the set time period in the same manner and then the communication module is used to execute the transmission task. In this embodiment, the preset data volume of the transmission data in a set time period can be adjusted according to the transmission capacity of the communication module to overcome the problems of the significant variation in the transmission capacity of the communication module, which makes the transmission capacity of the communication module too large, or the huge fluctuation of transmission data performance which will hinder the data transmission by other tasks. The data transmission performance is thereby improved. Furthermore, the real time period from the first reset of the main storage region to the reset of the main storage region is not shorter than the first set time period, so as to ensure that the specific data volume of the transmission data in the set time period is below or equal to the preset data volume of the transmission data in the set time period, so it is no feasible for the communication module to impose higher transmission capacity.

Example 4

Transmitting the transfer data to the backup terminal can include the following steps (steps D-1 to D-5):

D-1: transmitting the transmission task to the data linked list.

D-2: retrieving the transmission task from the data linked list according to a preset data volume of the transmission data in a set time period; the data volume of the transmission data in a set time period includes a first data segment of the transmission task being executed in the set time period.

D-3: Executing the transmission task through the communication module.

D-4: Confirming whether the total data numbers of the executed transmission task at the current time are equal to the preset critical number; if they are equal, it will switch to D-5 to execute, and then it will switch to D-2 to execute. If the total data number of the executed transmission task in the current time is below to the preset critical number, it will continuously retrieve and execute the transmission task from the data linked list.

D-5: Terminating a preset second time period. The transmission task being transmitted to the data linked list and retrieved from the data linked list are both restricted by bit rate transmission. To avoid the preset data volume of the transmission data within the set time period set forth in D-2, the bit rate of retrieving transmission task from the task linked list should be higher than the bit rate of transmitting transmission task to the data linked list in D-1, such that the transmission task is retrieved under the NULL status. In order to prevent a large difference between storing and retrieving data from the data linked list, by combining the storage and retrieval performances of data linked list, the critical number is preset as a second time period. If the total data number of transmission task executed at the current time is equal to the critical number, the second time period will be terminated so that the values retrieved from the current and subsequent data linked list will not be NULL. The critical number and the second time period can be preset before D-3. The transmission task is retrieved and executed according to the preset data volume of the transmission data in the set time period in the same manner and then the communication module is used to execute the transmission task. In this embodiment, the preset data volume of the transmission data in a set time period can be adjusted according to the transmission capacity of the communication module to overcome the problems of the significant variation in the transmission capacity of the communication module, which makes the transmission capacity of the communication module too large, or the huge fluctuation of transmission data performance which will hinder the information transmission by other tasks, thereby improving the data transmission performance. If the total data number of executed transmission task in the current time is equal to the preset critical number, the second time period will be terminated to avoid the situation that the transmission task is retrieved from the data linked list under the NULL status, thereby confirming the applicability of the data transmission configuration method.

It should be noted that the above embodiments are only used to explain the technical scheme of the invention, not the limitation. Although the invention is described in detail with reference to the preferred embodiments, it should be understood by those skilled in the art that the technical scheme of the invention can be modified or replaced equally without departing from the spirit and scope of the technical scheme of the invention which should be covered in the right of the invention.

What is claimed is:

1. A method for transmitting insulator on-site monitoring data backup comprising:
    connecting a central processing unit (CPU) in an insulator condition monitoring part to a communication module;
    establishing a connection between the CPU and a backup terminal through the communication module;
    retrieving a transmission data from the insulator condition monitoring part; and
    transmitting the transmission data to the backup terminal comprising the following steps:
        A-1: transmitting a transmission task into a data linked list, wherein the transmission task includes the transmission data and an identification code of the backup terminal; the data linked list being added with a new data to a tail end of the data linked list, and a data being retrieved from a head end of the data linked list;
        A-2: retrieving the transmission task from the data linked list according to a preset data volume of the transmission data in a set time period; the data volume of the transmission data in the set time period including a first data segment of the transmission task being executed in a first set time period;
        A-3: executing the transmission task through the communication module.

2. The method for transmitting insulator on-site monitoring data backup of claim 1, wherein the identification code of the backup terminal includes a string for uniqueness of a setting, an IP address of the backup terminal, and a MAC address of the backup terminal.

3. The method for transmitting insulator on-site monitoring data backup of claim 1, wherein the transmission data includes a leak current data of a horizontal insulator, a leak current data of an inclined insulator, and/or an environmental humidity parameter data.

4. The method for transmitting insulator on-site monitoring data backup of claim 3, wherein said executing the transmission task through the communication module includes:
    transmitting the leak current data of the horizontal insulator, the leak current data of the inclined insulator, or the environmental humidity parameter data to the backup terminal with the corresponding identification code of the backup terminal through said communication module according to the transmission task including the leak current data of the horizontal insulator, the leak current data of the inclined insulator, and/or the environmental humidity parameter data and the corresponding identification code of the backup terminal.

5. The method for transmitting insulator on-site monitoring data backup of claim 3, wherein transmitting the transmission data to the backup terminal are alternatively performed by the following steps:
    B-1: transmitting a transmission task into a data linked list, wherein the transmission task includes the transmission data and an identification code of the backup terminal; the data linked list being added with a new data to a tail end of the data linked list, and a data being retrieved from a head end of the data linked list;
    B-2: using fields as variables to request a data number in a main storage region, each main storage region only being stored with NULL or 1, and after the main storage region being requested, an initial value being NULL for a un-transmitted flag; the requested main storage region being used to store the transmitted flag; the data number being related to a preset data volume of the transmission data in a set time period, wherein the data volume of the transmission data in the set time period includes a first data segment of the transmission task being executed in a first set time period; the first data segment of the transmission task in the first set time period acting as a data number in the main storage region;
    B-3: confirming the transmitting flag having been stored in the main storage region of the first data segment in each of the first set time period; resetting the main storage region once each of the first set time period is completed; the transmitted flag being the stored transmitted flag after completing each of the transmission task, wherein
        if the transmitted flag has been stored in the main storage region of the first data segment in each first time period, B-3 will switch to B-4 to execute until the end of the first set time period, followed by switching to B-5 to execute after the completion of the first set time period, and subsequently switching to B-6 to execute; or if the transmitted flag has not been stored in the main storage region of the first data segment in each of the first set time period, B-3 will switch to B-6 to execute, followed by switching to B-5 to execute after the end of the first set time period;

retrieving and completing a transmission task retrieved from the data linked list, thereby storing in one of the main storage regions with the transmitted flag; and maintaining the main storage region in each of the first set time period during the data transmission of this configuration constant, and the value of the transmitted flag being 1, such that in each of the first set time period, by starting to execute a first transmission task of a current first set time period, once each of the transmission task is executed, 1 will be stored in sequence accordingly starting from a first requested ma in storage region until the completion of the current first set time period, resetting all the requested main storage regions, and then entering a subsequent first set time period;

in each of the first set time period of the main storage region of the first data segment, the stored transmitted flag in the main storage region can be classified into the following two categories:

in each of the first set time period, the transmitted flag has all been stored in all of the main storage regions of the first data segment;

in each of the first time period, the transmitted flag has not all been stored in all of the main storage regions of the first data segment;

B-4: terminating retrieval of the transmission task from the data linked list;

B-5: resetting the main storage region;

B-6: retrieving the transmission task from the data linked list;

B-7: executing the transmission task through the communication module;

B-8: after executing and completing the transmission task at the current time, the transmitted flag being stored in a space with NULL in the main storage region in sequence; the data being stored in the main storage region in said sequence; and in each of the first set time period, the region having been stored with transmitted flag not being stored with the transmitted flag again.

6. The method for transmitting insulator on-site monitoring data backup of claim 5, wherein the size of each of the fields is 8 bits.

7. The method for transmitting insulator on-site monitoring data backup of claim 5, wherein in step B-3, the main storage region is reset once each of the first set time period is completed; said resetting is to fill in all values in the main storage region with NULL.

8. The method for transmitting insulator on-site monitoring data backup of claim 5, wherein in step B-6, if the transmitted flag has been stored in all of the main storage regions of the first data segment in each of the first set time period, there will be no other main storage region for continuously storing the transmitted flag.

9. The method for transmitting insulator on-site monitoring data backup of claim 5, wherein the transmitted flag stored in the main storage region is a mark for marking completion of a transmission task; the completion of the transmission task includes completion of data transmission, or an incomplete condition of the data transmission over a set time through the communication module.

10. The method for transmitting insulator on-site monitoring data backup of claim 1, wherein transmitting the transmission data to the backup terminal are alternatively performed by the following steps:

C-1: transmitting a transmission task into a data linked list, wherein the transmission task includes the transmission data and an identification code of the backup terminal; the data linked list being added with a new data to a tail end of the data linked list, and a data being retrieved from a head end of the data linked list;

C-2: using fields as variables to request a data number in a main storage region, each of the main storage regions only being stored with NULL or 1, and after the main storage region being requested, an initial value being NULL for an untransmitted flag; the requested main storage region being used to store the transmitted flag; the data number being related to a preset data volume of the transmission data in a set time period, the data volume of the transmission data in the set time period including a first data segment of the transmission task being executed in a first set time period; the first data segment of the transmission task in the first set time period acting as the data number in the main storage region;

C-3: confirming whether a time spent on storing the transmitted flag in the main storage region of the first data segment is shorter than the first set time period; the transmitted flag being the stored transmitted flag after completing each transmission task, wherein if the time spent on storing the transmitted flag in the main storage region of the first data segment is shorter than the first set time period, C-3 will switch to C-4 to execute until the sum of the time spent and a terminating time equals the first set time period, followed by switching to C-5 to execute, and subsequently switching to C-6 to execute; or if the time on storing the transmitted flag in the main storage region of the first data segment is not shorter than the first set time period, C-3 will switch to C-5 to execute, followed by switching to C-6 to execute;

C-4: terminating retrieval of the transmission task from the data linked list;

C-5: resetting the main storage region;

C-6: retrieving the transmission task from the data linked list;

C-7: executing the transmission task through the communication module;

C-8: after executing and completing the transmission task at the current time, the transmitted flag being stored in a space with NULL in the main storage region in sequence; the data being stored in the main storage region in said sequence; in each of the first set time period, the region having been stored with transmitted flag not being stored with the transmitted flag again.

11. The method for transmitting insulator on-site monitoring data backup of claim 1, wherein transmitting the transmission data to the backup terminal is alternatively performed by the following processes:

D-1: transmitting a transmission task into a data linked list;

D-2: retrieving the transmission task from the data linked list according to a preset data volume of the transmission data in a set time period; the data volume of the transmission data in a set time period including a first data segment of the transmission task being executed in the set time period;

D-3: executing the transmission task through the communication module.

D-4: confirming whether the total data number of the executed transmission task in the current time is equal to a preset critical number;
- if they are equal, D-4 will switch to D-5 to execute, followed by switching to D-2 to execute; or
- if the total data number of the executed transmission task in the current time is below to the preset critical number, the transmission task will be continuously retrieved from the data linked list for execution;

D-5: terminating a preset second time period; presetting the critical number and the second time period before D-3.

* * * * *